US012625382B2

(12) United States Patent
Lu

(10) Patent No.: US 12,625,382 B2
(45) Date of Patent: May 12, 2026

(54) ONE-WAY HOMOGENEOUS BEAM EXPANDING SCREEN AND THREE-DIMENSIONAL DISPLAY DEVICE

(71) Applicant: FAITH BILLION TECHNOLOGY DEVELOPMENT LIMITED, Wanchai (HK)

(72) Inventor: Zengxiang Lu, Hong Kong (HK)

(73) Assignee: Faith Billion Technology Development Limited, Wanchai (HK)

( * ) Notice: Subject to any disclaimer, the term of this patent is extended or adjusted under 35 U.S.C. 154(b) by 493 days.

(21) Appl. No.: 18/016,796

(22) PCT Filed: Mar. 3, 2021

(86) PCT No.: PCT/CN2021/078851
§ 371 (c)(1),
(2) Date: Jan. 18, 2023

(87) PCT Pub. No.: WO2022/027959
PCT Pub. Date: Feb. 10, 2022

(65) Prior Publication Data
US 2024/0036340 A1 Feb. 1, 2024

(30) Foreign Application Priority Data
Aug. 7, 2020 (CN) ......................... 202010789272.X

(51) Int. Cl.
*G02B 27/09* (2006.01)
*G02B 30/29* (2020.01)

(52) U.S. Cl.
CPC ..... *G02B 27/0955* (2013.01); *G02B 27/0944* (2013.01); *G02B 30/29* (2020.01)

(58) Field of Classification Search
CPC ............ G02B 27/0955; G02B 27/0944; G02B 27/0911; G02B 27/0927; G02B 30/29;
(Continued)

(56) References Cited

U.S. PATENT DOCUMENTS

| 6,487,020 B1 * | 11/2002 | Favalora | .............. H04N 13/393 |
| | | | 348/E13.043 |
| 2006/0066945 A1 * | 3/2006 | Yeo | ......................... G02B 3/08 |
| | | | 359/457 |

(Continued)

FOREIGN PATENT DOCUMENTS

| CN | 1725103 | 1/2006 |
| CN | 102854630 | 1/2013 |

(Continued)

OTHER PUBLICATIONS

European Patent Office, Supplemental European Search Report, mailed Aug. 1, 2024, in EP Application 21853007.9.
(Continued)

*Primary Examiner* — Angela M. Medich
(74) *Attorney, Agent, or Firm* — Faegre Drinker Biddle & Reath LLP

(57) ABSTRACT

An one-way homogeneous beam expanding screen (20) and a three-dimensional display device. The one-way homogeneous beam expanding screen (20) comprises a lenticular grating (22) and at least one linear Fresnel lens (21); the linear Fresnel lens (21) is located between a projection unit (10) and the lenticular grating (22); the linear Fresnel lens (21) comprises a plurality of tooth-shaped structures (211) extending in a second direction (x); the linear Fresnel lens (21) is used for deflecting a light beam emitted by the projection unit (10) and enabling the deflected light beam to be normally incident to the lenticular grating (22); a grating line (221) of the lenticular grating (22) extends along the second direction (x); the lenticular grating (22) is used for uniformly expanding a light beam emitted by the linear Fresnel lens (21) along a first direction (y), wherein the first direction (y) intersects with the second direction (x).

20 Claims, 13 Drawing Sheets

(58) Field of Classification Search
CPC .... G02B 30/54; G02B 3/0068; G03B 21/562;
G03B 21/625; H04N 13/393
See application file for complete search history.

(56) References Cited

U.S. PATENT DOCUMENTS

| | | |
|---|---|---|
| 2010/0027113 A1 | 2/2010 | Shin et al. |
| 2011/0222151 A1 | 9/2011 | Morikuni et al. |

FOREIGN PATENT DOCUMENTS

| | | |
|---|---|---|
| CN | 105445833 | 3/2016 |
| CN | 105988225 | 10/2016 |
| CN | 108761819 | 11/2018 |
| CN | 111158162 | 5/2020 |
| CN | 111929914 | 11/2020 |
| JP | 03-134648 | 6/1991 |
| JP | 09-274159 | 10/1997 |
| JP | 10-501636 | 2/1998 |
| JP | 10-115800 | 5/1998 |
| JP | 2005-295325 | 10/2005 |
| JP | 2015-069148 | 4/2015 |
| WO | WO 2020/091878 | 5/2020 |

OTHER PUBLICATIONS

Patent Cooperative Treaty, International Search Report, mailed May 31, 2021, in PCT/CN2021/078851.
Patent Cooperative Treaty, Written Opinion, mailed May 31, 2021, in PCT/CN2021/078851.
European Patent Office, Extended European Search Report, mailed Nov. 8, 2024, in EP Application 21853007.9.

\* cited by examiner 21 22 23

21 22 23

Splicing area before correction

Splicing area after correction

ONE-WAY HOMOGENEOUS BEAM EXPANDING SCREEN AND THREE-DIMENSIONAL DISPLAY DEVICE

CROSS-REFERENCE TO RELATED APPLICATIONS

The present application claims priority to International Application No. PCT/CN2021/078851, filed on Mar. 3, 2021, which claims priority to Chinese Patent Application No. 202010789272.X filed with China National Intellectual Property Administration on Aug. 7, 2020, the contents of which are incorporated herein by reference in their entireties for all purposes.

TECHNICAL FIELD

The embodiments of the present application relate to the technology of three-dimensional displaying, for example, to a screen for unidirectional beam homogenizing and expanding and a three-dimensional display device.

BACKGROUND

In the related technology, naked eye three-dimensional displaying can be achieved based on principles such as holographic projection, lenticular gratings, volumetric 3D and integral imaging. In terms of implementation, a lenticular grating uses the refraction effect of the cylindrical lens to present different pictures at different angles, so a three-dimensional visual effect is produced based on the parallax caused by separate left eye's images and right eye's images.

In three-dimensional display devices, vector pixels can be used as the image source. The number of vector pixels, thus the costs, can be reduced by using a lenticular grating for unidirectional beam expanding. When beam expanding is performed at a relatively small angle, the beam homogeneity is relatively good. When beam expanding is performed at a required large angle, the peripheral area is less bright than the central area, which leads to an abrupt change in brightness when the image is viewed from one position to another in the direction of beam expanding and thus to inhomogeneous displaying.

SUMMARY

The embodiments of the present application provide a screen for unidirectional beam homogenizing and expanding and a three-dimensional display device, wherein the screen for unidirectional beam homogenizing and expanding can expand, along the same direction (i.e., a first direction), beams of light emitted by a projection unit into light cones with uniform intensity and same distribution, with propagation direction and angle of divergence unchanged along a second direction, and make rays of light emitted by two projection units have the same brightness after unidirectional homogenizing and beam expanding, avoiding abrupt changes in brightness in spliced images; the screen can improve display brightness and homogeneity when applied to the three-dimensional display device.

In a first aspect, an embodiment of the present application provides a screen for unidirectional beam homogenizing and expanding, which is arranged to expand, along a first direction, beams of light with different angles of emergence emitted by a projection unit into light cones with uniform intensity and same distribution, with propagation direction and angle of divergence unchanged along a second direction, wherein the screen for unidirectional beam homogenizing and expanding comprises a lenticular grating and at least one linear Fresnel lens;

the linear Fresnel lens is positioned between the projection unit and the lenticular grating;

the linear Fresnel lens comprises a plurality of tooth-shaped structures extending along the second direction, and the linear Fresnel lens is arranged to deflect the beams of light emitted by the projection unit to enable the deflected beams of light to be normally incident on the lenticular grating;

grid lines of the lenticular grating extend along the second direction, and the lenticular grating is arranged to uniformly expand, along the first direction, the beams of light that exit the linear Fresnel lens;

when the screen for unidirectional beam homogenizing and expanding comprises at least two linear Fresnel lenses, the linear Fresnel lenses are arranged along the first direction, and beams of light emitted by two adjacent projection units along the first direction and received at the seam position of two adjacent linear Fresnel lenses form the same distribution after passing through the screen for unidirectional beam homogenizing and expanding;

wherein the projection units are in one-to-one correspondence with the linear Fresnel lenses, a perpendicular distance between the projection units and the one-to-one corresponding linear Fresnel lenses is equal to the focal length of the linear Fresnel lens, and the first direction intersects the second direction.

In a second aspect, an embodiment of the present application also provides a three-dimensional display device, which comprises:

a rotary table rotating around a central axis of the rotary table, wherein the central axis extends in a first direction;

at least one light pole fixed on the rotary table, wherein the light pole comprises at least one projection unit, each of the projection units is arranged to emit light in at least two directions in a plane perpendicular to the first direction to form at least two viewpoints; and any one of the screens for unidirectional beam homogenizing and expanding described above, wherein the screens for unidirectional beam homogenizing and expanding are arranged in one-to-one correspondence with the light poles and positioned on emergent optical paths of the projection units.

DETAILED DESCRIPTION

Figure 1:
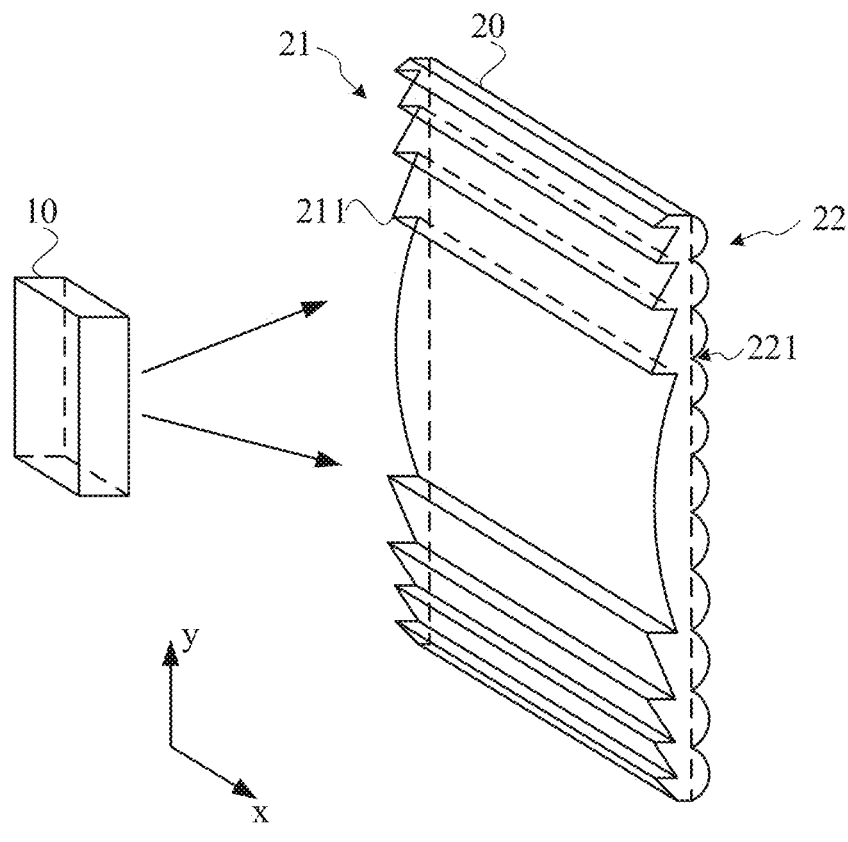
FIG. 1 is a schematic structural diagram of a screen for unidirectional beam homogenizing and expanding according to an embodiment of the present application.

The terminology used in the embodiments of the present application is only for the purpose of describing particular embodiments and is not intended to limit the present application. It should be noted that the positional terms such as "on", "under", "left", "right" described in the embodiments of the present application are described from the angles shown in the drawings and should not be construed as limiting the embodiments of the present application. In addition, in the context, it should also be understood that when an element is described as being formed "on" or "under" another element, it can be directly formed "on" or "under" the other element or be indirectly formed "on" or "under" the other element through an intermediate element. The terms "first" and "second" and the like are used for descriptive purposes only and are not intended to denote any order, quantity or importance, but rather are used to distinguish one component from another. For those of ordinary skill in the art, the specific meanings of the aforementioned terms in the present application can be understood according to specific conditions.

Figures 2, 3:
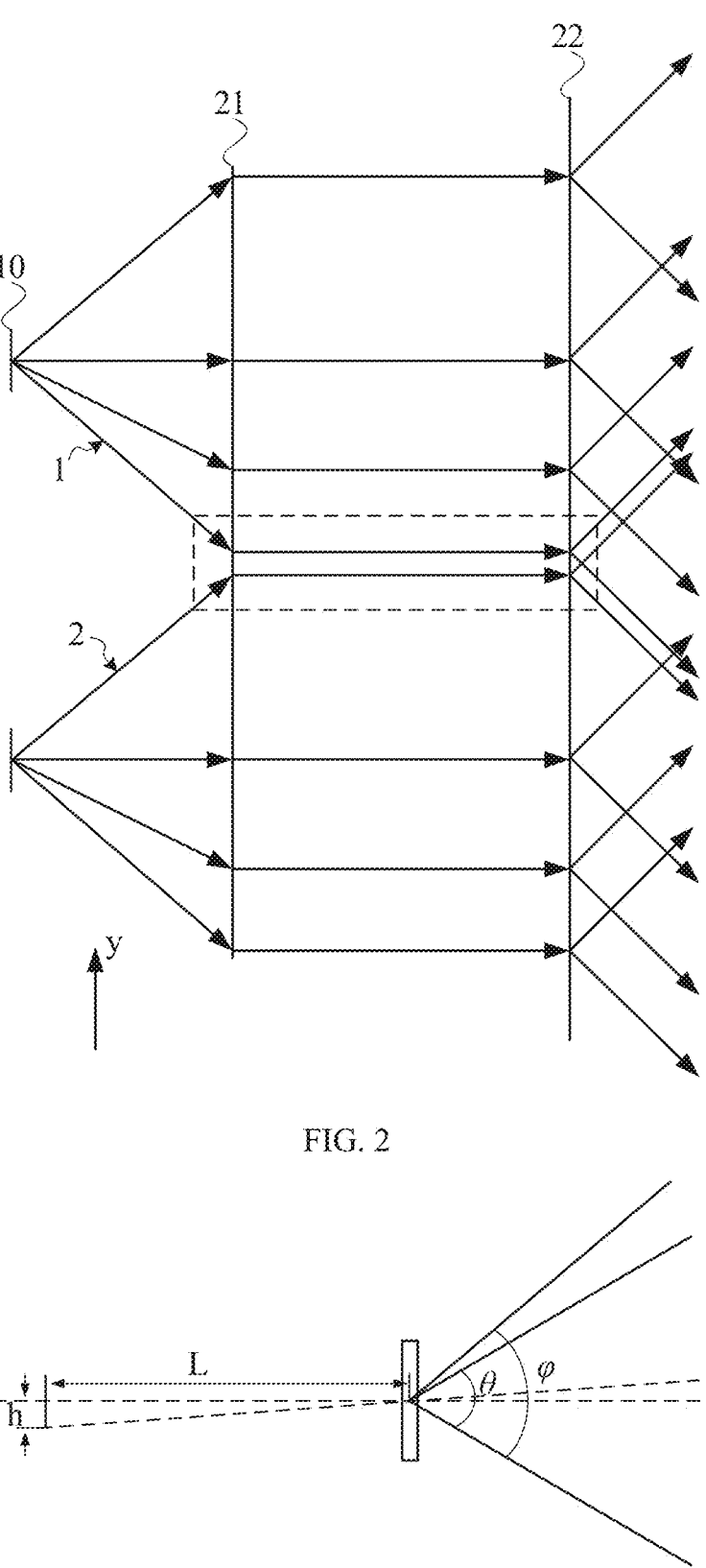
FIG. 2 is a schematic diagram of optical paths during beam expanding by a screen for unidirectional beam homogenizing and expanding according to an embodiment of the present application.
FIG. 3 is a schematic structural diagram of an effective setting area of a projection unit according to an embodiment of the present application.

FIG. 1 is a schematic structural diagram of a screen for unidirectional beam homogenizing and expanding according to an embodiment of the present application. FIG. 2 is a schematic diagram of optical paths during beam expanding by a screen for unidirectional beam homogenizing and expanding according to an embodiment of the present application. Referring to FIGS. 1 and 2, the screen for unidirectional beam homogenizing and expanding 20 according to this embodiment is arranged to expand, along a first direction y, beams of light emitted by a projection unit 10 into light cones with uniform intensity and same distribution, with propagation direction and angle of divergence along a second direction x unchanged, wherein the screen for unidirectional beam homogenizing and expanding 20 comprises a lenticular grating 22 and at least one linear Fresnel lens 21 (only one linear Fresnel lens is illustratively shown in FIG. 1); the linear Fresnel lens 21 is positioned between the projection unit 10 and the lenticular grating 22; the linear Fresnel lens 21 comprises a plurality of tooth-shaped structures 211 extending along the second direction x, and the linear Fresnel lens 21 is arranged to deflect beams of light emitted by the projection unit 10 to enable the deflected beams of light to be normally incident on the lenticular grating 22; grid lines 221 of the lenticular grating 22 extend along the second direction x, and the lenticular grating 22 is arranged to uniformly expand, along the first direction y, the beams of light that exit the linear Fresnel lens 21; when the screen for unidirectional homogenizing and beam-expanding 20 comprises at least two linear Fresnel lenses 21, the linear Fresnel lenses 21 are arranged along the first direction y, and beams of light emitted by two adjacent projection units 10 along the first direction y and received at the seam position (see the part indicated by a dashed-line box in FIG. 2) of two adjacent linear Fresnel lenses 21 form the same distribution after passing through the screen for unidirectional beam homogenizing and expanding; wherein the projection units 10 are in one-to-one correspondence with the linear Fresnel lenses 21, a perpendicular distance between the projection units and the one-to-one corresponding linear Fresnel lenses is equal to the focal length of the linear Fresnel lens 21, and the first direction y intersects the second direction x.

Illustratively, by way of example, the first direction y is perpendicular to the second direction x in this embodiment, wherein the first direction y may be the vertical direction, and the second direction x may be the horizontal direction. The projection unit 10 may comprise at least one vector pixel or pico projector. The vector pixel refers to an optical display module consisting of a sub-pixel array and an optical module, wherein the sub-pixel array consists of dense display devices (such as Micro-LED arrays) as basic display units. After the sub-pixel array passes the optical module, each sub-pixel's beam of light is directed at a different angle in the space, and only particular sub-pixels can be seen from different directions—that is, the pixels has vector directivity. The vector pixels meet the following conditions: 1. A point light source with a narrow beam of light. With respect to large display dimensions, the vector pixel can be seen approximately as a light source that emits light from one point (for example, the light source makes up only a ten-thousandth of a display area or less), and most of the beams of light emitted by it into the space have the following property: if the boundary of the beam of light is defined as where the light intensity decreases to 50% of the maximum light intensity of the beam of light and the light source is taken as the center of a circle, the minimum spatial spherical angle that allows the entire boundary to be included is less than 10 degrees. 2. Being capable of emitting the beam of light described above in at least 100 distinguishable directions. 3. Being capable of emitting the beam of light described above in at least 2 directions simultaneously. 4. The brightness of the beam of light described above is adjustable in at least 16 steps.

Referring to FIG. 2, the projection unit 10 is located at the focal length of the linear Fresnel lens 21, and the divergent beams of light emitted by the projection unit 10 are incident on the linear Fresnel lens 21; the linear Fresnel lens 21 only changes the components of the beams of light emitted by the projection unit 10 that propagate in the first direction y and does not change the components of the beams of light emitted by the projection unit 10 that propagate in the second direction x; then the linear Fresnel lens 21 deflects the beams of light into approximately parallel beams of light, and the approximately parallel beams of light are approximately perpendicularly incident on the lenticular grating 22, with the angles of the beams of light in the second direction x unchanged; by designing the shape of each cylindrical lens in the lenticular grating 22, it can be achieved that the beams of light are uniformly expanded to be at different angles of divergence in the first direction y; the smaller the focal length of the cylindrical lens, the larger the angle of unidirectional beam expanding. In order to make the processing less difficult, a plurality of the linear Fresnel lenses 21 can be spliced, and they should be aligned as much as possible to reduce gaps when being spliced. By designing the linear Fresnel lens 21, a ray of light 1 emitted by an upper projection unit and a ray of light 2 emitted by an lower projection unit are almost normally incident on the lenticular grating 22 after passing through the linear Fresnel lens 21 and then expanded in the first direction y with uniform intensity and the same distribution after passing through the lenticular grating 22—that is, although the ray of light 1 and the ray of light 2 have different intensity and distribution when being incident on the linear Fresnel lens 21, they have the same intensity and distribution after passing through the screen for unidirectional beam homogenizing and expanding. In addition, the combined thickness of the linear Fresnel lens 21 and the lenticular grating 22 is designed to be less than or equal to the focusing depth of field of the beams of light emitted by the projection unit 10, so that the imaging definition is ensured. Optionally, a pixel in each projection unit has a spot width of $d_1$ along the first direction on the screen for unidirectional beam homogenizing and expanding, the lenticular grating has a grating constant of $d_2$, and $d_1 \geq 3d_2$. That is, the spot of each pixel corresponds to at least three cylindrical lenses of the lenticular grating to ensure sufficient imaging resolution.

Optionally, the number of lines in the lenticular grating 22 is greater than or equal to 300 lines per inch. The number can be designed according to the actual display quality and requirement in specific implementation. When the number of lines in the lenticular grating is small, especially when the width of the cylindrical lens is greater than the size of a projection pixel, imaging beams of light are unidirectionally expanded after passing through the lenticular grating, and an enlarged virtual image of the projection pixel will be seen through human eyes. The size of the virtual image is greater than that of the projection pixel. When the width of the cylindrical lens is smaller than the size of the projection pixel, the image of the projection pixel is projected onto the lenticular grating in a plurality of portions; at this moment a plurality of virtual images of the plurality of portions of the projection pixel overlap when seen through human eyes; the greater the number of lines in the grating, the higher the overlapping rate of the virtual images of the plurality of portions, the closer the virtual images seen is to the projection pixel in size.

According to the technical scheme of this embodiment, a linear Fresnel lens is arranged, the linear Fresnel lens deflects divergent beams of light emitted by a projection unit into approximately parallel beams of light, and then the approximately parallel beams of light are approximately perpendicularly incident on the lenticular grating; beams of light that exit the linear Fresnel lens are expanded along a first direction, with propagation direction and angle of divergence unchanged along a second direction, so that the uniform beam expanding in the first direction can be achieved by the lenticular grating due to the deflection effect of the linear Fresnel lens. When a splicing imaging of a plurality of projection units is performed, the brightness of seams can be made uniform, and when applied to a three-dimensional display device, the display brightness and homogeneity can be improved to promote the display effect.

Optionally, the projection unit 10 is arranged at a focal point of the corresponding linear Fresnel lens 21. By arranging the projection unit 10 at the focal point of the linear Fresnel lens 21, the rays of light incident on the linear Fresnel lens 21 from the projection unit 10 is perpendicularly incident on the lenticular grating 22, and the lenticular grating 22 realizes uniform beam expanding of all the incident rays of light.

Optionally, the projection unit is arranged on a focal plane of the corresponding linear Fresnel lens, and a distance h between the projection unit and the focal point of the linear Fresnel lens satisfies:

$$h \leq L \cdot \tan\frac{\varphi - \theta}{2}; \tag{1}$$

wherein L represents a focal length of the linear Fresnel lens, φ represents an actual beam expansion angle of the screen for unidirectional beam homogenizing and expanding along the first direction, and θ represents a desired viewing angle along the first direction.

Since the projection unit has a certain size and expands outward from the focal point, so that an area that can meet the viewing needs forms an incident effective position area. FIG. 3 is a schematic structural diagram of an effective setting area of a projection unit according to an embodiment of the present application. Referring to FIG. 3, L represents a focal length of the linear Fresnel lens, φ represents an actual beam expansion angle of the screen for unidirectional beam homogenizing and expanding along the first direction, and θ represents a desired viewing angle along the first direction. When the distance h arranged between the projection unit and the focal point of the linear Fresnel lens satisfies the formula (1) described above, the definition of the image observed by an observer can be ensured. Illustratively, a scattering angle of the screen for unidirectional beam homogenizing and expanding being 60 degrees satisfies viewing needs. When the scattering angle of the screen for unidirectional beam homogenizing and expanding is only 60 degrees, there is only one point in the vertical direction (i.e., the first direction y) that meets the requirement; the point is on an optical axis of the screen for unidirectional beam homogenizing and expanding. When the scattering angle of the screen for unidirectional beam homogenizing and expanding is greater than 60 degrees, for example, the projection unit is 50 mm from the screen for unidirectional beam homogenizing and expanding and the scattering angle of the screen for unidirectional beam homogenizing and expanding is 70 degrees, viewing needs can be satisfied by placing the projection unit in a position within a ±4.37 mm area of a symmetrical position of the optical axis of the screen for unidirectional beam homogenizing and expanding in the vertical direction.

Figure 4:
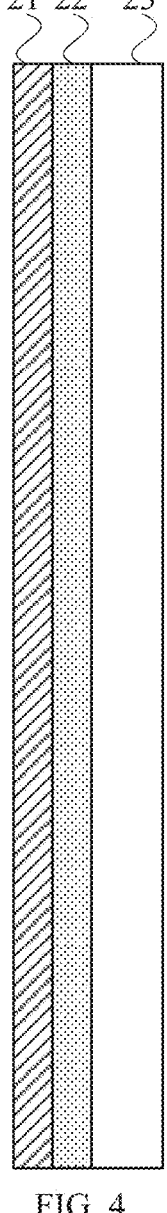
FIG. 4 is a schematic structural cross-sectional view of a screen for unidirectional beam homogenizing and expanding according to an embodiment of the present application.

In the screen for unidirectional beam homogenizing and expanding according to this embodiment, for ease of installation, the linear Fresnel lens and the lenticular grating are both designed as very thin films. FIG. 4 is a schematic structural cross-sectional view of a screen for unidirectional beam homogenizing and expanding according to an embodiment of the present application. Referring to FIG. 4, optionally, the screen for unidirectional beam homogenizing and expanding according to this embodiment further comprises a support lens 23 positioned on one side of the lenticular grating 22 facing away from the projection unit, wherein the support lens 23 is arranged to support the linear Fresnel lens 21 and the lenticular grating 22. Optionally, the support lens 23 may be an iso-thickness lens or a cylindrical concave lens.

Figure 5:
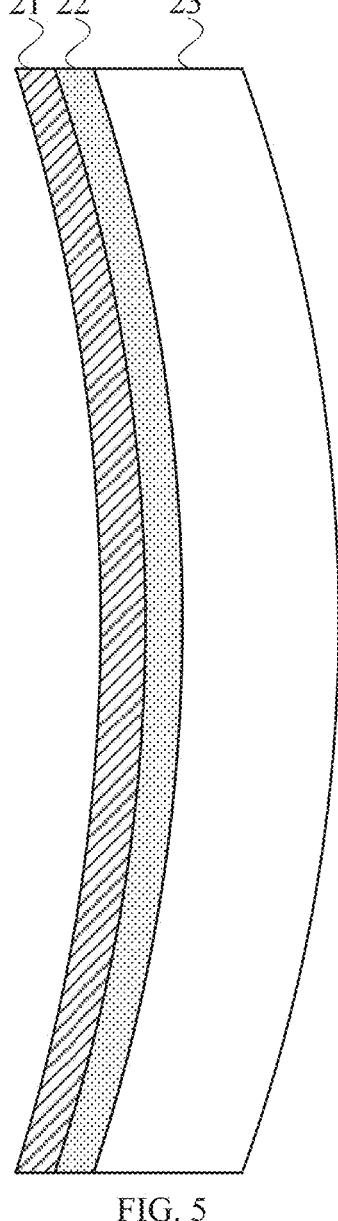
FIGS. 5 and 6 are schematic structural top views of another screen for unidirectional beam homogenizing and expanding according to an embodiment of the present application.
Figure 6:
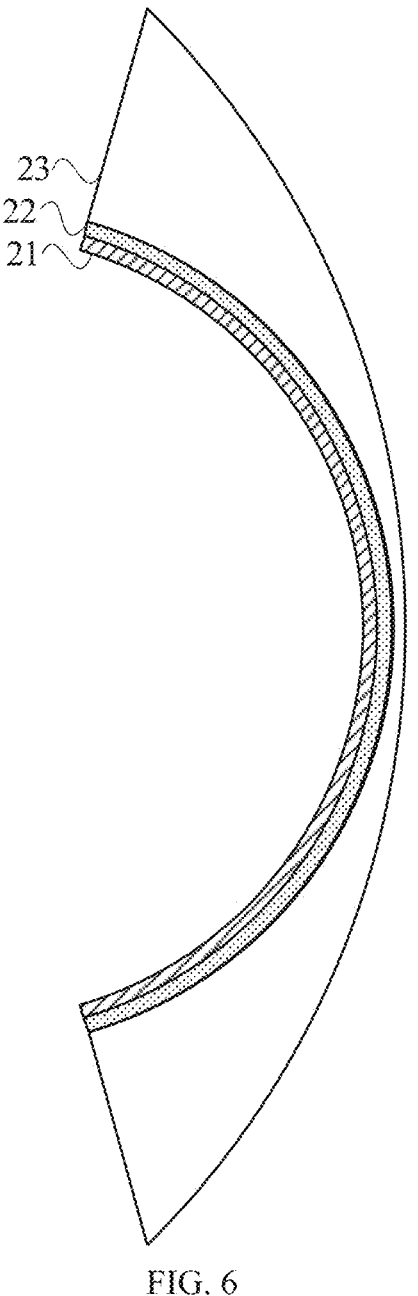

Referring to FIG. 4, the support lens 23 is an iso-thickness lens, and at this time, the support lens 23 only serves as a support. In other embodiments, the support lens may also be designed as a cylindrical concave lens. When a vector pixel or a pico projector projects onto the screen for unidirectional beam homogenizing and expanding, the optical paths through which the rays of light with different angles of emergence travel to the screen for unidirectional beam homogenizing and expanding are different, and these rays of light passing through the screen for unidirectional beam homogenizing and expanding will lead to aberration. In order to reduce aberration, optionally, one side of the support lens 23 close to the projection unit is a first surface, the first surface is a curved surface, the lenticular grating 22 is attached to the first surface of the support lens 23, and the linear Fresnel lens 21 is attached to one side of the lenticular grating 22 facing away from the support lens 23. Illustratively, FIGS. 5 and 6 are schematic structural cross-sectional views of another screen for unidirectional beam homogenizing and expanding according to an embodiment of the present application. Referring to FIG. 5, the first surface may be configured as an arc surface, and a projection unit (not shown in FIG. 5) is located at the center of the circle and at the focal point of the linear Fresnel lens, so that rays of lights emitted in various directions by the projection unit are at the same distance from the screen for unidirectional beam homogenizing and expanding. By configuring the first surface as a curved surface, distortion and bending of the spots of unidirectional beam expanding caused by lenticular grating aberration can be avoided, and curvature of field and distortion caused by the projection unit's large-angle imaging are reduced to a certain extent, which favors the subsequent splicing imaging of a plurality of projection units. When the screen for unidirectional beam homogenizing and expanding is a plane and the projection unit projects through the linear Fresnel lens onto the lenticular grating for beam expanding, the projected images are in different size as the sub-pixels are at different distances from the screen for unidirectional beam homogenizing and expanding. In addition, when the sub-pixels of the projection unit projects an image onto the screen for unidirectional beam homogenizing and expanding and the axis of the beam cone forming each sub-pixel is not normally incident on the lenticular grating of the screen for unidirectional beam homogenizing and expanding, distortion will occur when spots are unidirectionally opened by the lenticular grating due to cylindrical lens aberration, and the linear spot of unidirectional beam expanding finally formed will be bent. At this time, if the images of the corresponding column of sub-pixels of the projection unit projected onto the screen for unidirectional beam homogenizing and expanding are viewed from a certain viewpoint, the column of pixels is bent. If the axis direction of the lenticular grating is bent at this time, the bending will be reduced or eliminated. Therefore, the screen for unidirectional beam homogenizing and expanding of the embodiment of the present application is arranged to be bent into an arc. Referring to FIG. 6, the central area of the support lens 23 is less thick than the areas on both side. When an image source of projection is placed at a midpoint of the focal line of the cylindrical concave lens, the viewing angle of the projection device can be unidirectionally increased. The structure of the support lens can be designed according to actual needs in specific implementation, and is not limited by the embodiment of the present application.

Referring to FIG. 1, the linear Fresnel lens 21 and the lenticular grating 22 are in the form of an integrated diaphragm, the tooth-shaped structures 211 of the linear Fresnel lens 21 are positioned on the surface of one side of the integrated diaphragm close to the projection unit 10, and the lenticular grating 22 is positioned on the surface of one side of the integrated diaphragm facing away from the projection unit 10. Such a design can simplify the structure of the screen for unidirectional beam homogenizing and expanding, reduce the alignment process of the linear Fresnel lens 21 and the lenticular grating 22, reduce the difficulty in preparation and installation, and reduce the cost.

Figure 7:
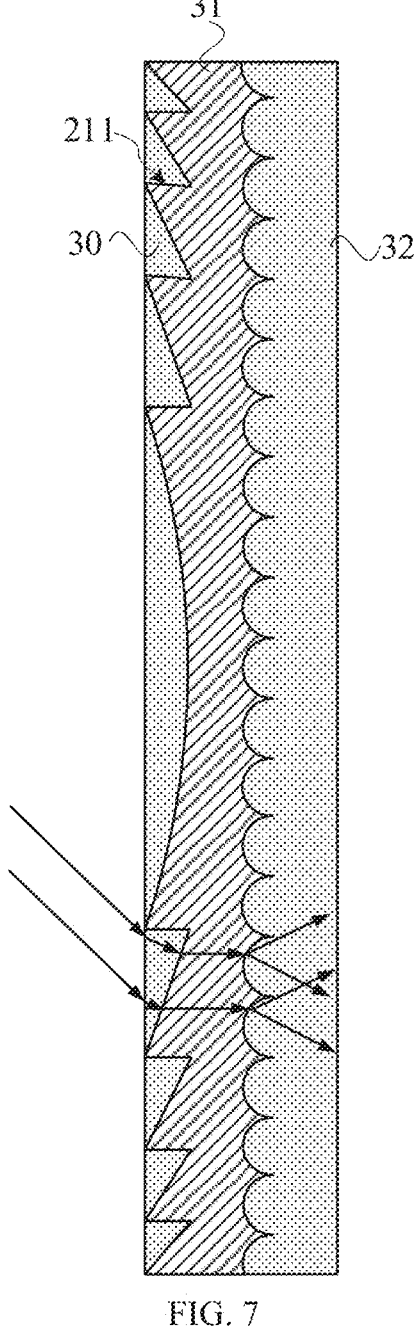
FIG. 7 is a schematic structural cross-sectional view of another screen for unidirectional beam homogenizing and expanding according to an embodiment of the present application.

FIG. 7 is a schematic structural cross-sectional view of a screen for unidirectional beam homogenizing and expanding according to an embodiment of the present application. Referring to FIG. 7, optionally, the screen for unidirectional beam homogenizing and expanding according to this embodiment comprises a first medium layer 30, a second medium layer 31 and a third medium layer 32 sequentially stacked, wherein the first medium layer 30 is positioned on one side of the second medium layer 31 close to the projection unit 10, and the first medium layer 30 and the third medium layer 32 both have a greater index of refraction than the second medium layer 31; an interface between the first medium layer 30 and the second medium layer 31 is provided with tooth-shaped structures 211 of a linear Fresnel lens, the interface between the second medium layer 31 and the third medium layer 32 is provided with a lenticular grating, and the surface of the third medium layer 32 facing away from the second medium layer 31 is a plane.

Illustratively, FIG. 7 may also include a support lens 23, in which case the support lens 23 is attached to one side of the first medium layer 30 facing away from the second medium layer 31, or the support lens 23 is attached to one side of the third medium layer 32 facing away from the second medium layer 31.

Both sides of the screen for unidirectional beam homogenizing and expanding shown in FIG. 1 are provided with teeth, which is beneficial to reducing the process cost but may present certain difficulty in installation. Therefore, for ease of installation, illustratively, both sides of the screen for unidirectional beam homogenizing and expanding shown in FIG. 7 are flat, the indexes of refraction of the first medium layer 30, the second medium layer 31 and the third medium layer 32 are $n_1$, $n_2$ and $n_3$, respectively, of which $n_2$ is the smallest. In other embodiments, one side or both sides of the screen for unidirectional beam homogenizing and expanding may also be non-flat. Designing may be performed according to actual needs in specific implementation. FIG. 7 also shows a schematic diagram of optical path transmission of the screen for unidirectional beam homogenizing and expanding. According to the Snell's Law, when parallel beams of light pass through the first medium layer 30 with an index of refraction of $n_1$ on the left side of the screen for unidirectional beam homogenizing and expanding at a certain angle, the beams of light are refracted twice. The first refraction occurs on the vertical left side of the screen for unidirectional beam homogenizing and expanding from air into $n_1$, and the second refraction occurs from inclined surfaces or curved surfaces (tooth-shaped structures 211) into the second medium layer 31 with an index of refraction of $n_2$. According to inclined surfaces or curved surfaces with properly designed angles of incidence, the beams of light will be eventually incident on the third medium layer 32 with an index of refraction of $n_3$ in the horizontal direction. When the parallel beams of light enter the third medium layer 32 with an index of refraction of $n_3$ from the second medium layer 31 with an index of refraction of $n_2$, the beams of light are unidirectionally opened upon passing through an interface of the two media with the indexes of refraction of $n_2$ and $n_3$ as the interface is a cylindrical grating, and thus homogenizing and unidirectional beam expanding are achieved. In a flat screen for unidirectional beam homogenizing and expanding, the tooth-shaped structures 211 of the linear Fresnel lens may consist of at least one of curved surfaces or inclined surfaces. In other embodiments, the left surface of the first medium layer 30 and the right surface of the third medium layer 32 may also form curved surfaces when attached to the support lens according to actual needs. Designing may be performed according to actual needs in specific implementation.

Illustratively, the second medium layer 31 may be very thin and may approach a functional surface of the lenticular grating and infinitely approach a functional surface of the linear Fresnel lens, and the thickness of both sides of the functional surface have no influence on the performance of the screen for unidirectional beam homogenizing and expanding—that is, there is no strict limitation on the thickness of the screen for unidirectional beam homogenizing and expanding so long as a thin second medium layer 31 is maintained between the functional surfaces, so the difficulty in processing can be reduced.

Optionally, the first medium layer and the third medium layer have the same index of refraction. Illustratively, the first medium layer and the third medium layer may be formed of the same material so as to simplify the process and reduce the manufacturing costs of the screen for unidirectional beam homogenizing and expanding.

Figure 8:
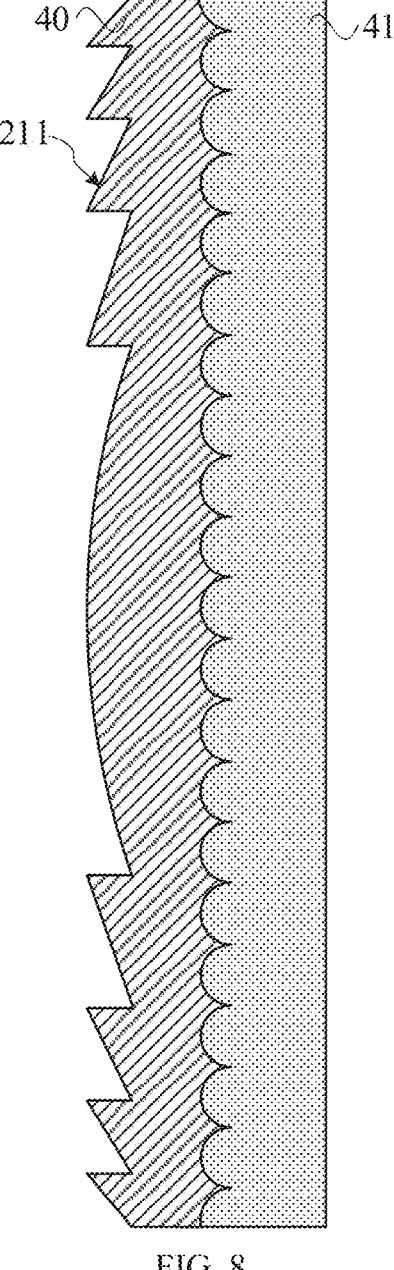
FIG. 8 is a schematic structural cross-sectional view of another screen for unidirectional beam homogenizing and expanding according to an embodiment of the present application.

In another embodiment, one side of the screen for unidirectional beam homogenizing and expanding may also be designed as a plane. Illustratively, taking a light emitting surface as a plane as an example, FIG. 8 is a schematic structural cross-sectional view of another screen for unidirectional beam homogenizing and expanding according to an embodiment of the present application. Referring to FIG. 8, optionally, the screen for unidirectional beam homogenizing and expanding comprises a fourth medium layer 40 and a fifth medium layer 41 arranged in a stacked manner, wherein the fourth medium layer 40 is positioned on one side of the fifth medium layer 41 close to the projection unit, and the fifth medium layer 41 has a greater index of refraction than the fourth medium layer 40; the surface on one side of the fourth medium layer 40 close to the projection unit is provided with tooth-shaped structures 211 of a linear Fresnel lens, the interface between the fourth medium layer 40 and the fifth medium layer 41 is provided with a lenticular grating, and the surface of the fifth medium layer 41 facing away from the fourth medium layer 40 is a plane.

Light is incident on the fourth medium layer 40 with an index of refraction of $n_4$ from air, the tooth-shaped structures 211 on the fourth medium layer 40 are designed as a linear Fresnel lens with a preset focal length, and the projection unit is arranged at a focal point of the linear Fresnel lens. When rays of light emitted from the focal point pass through the interface between the air and the fourth medium layer 40, the rays of light can be horizontally incident on the fifth medium layer 41 with an index of refraction of $n_5$, wherein $n_5 > n_4$. The interface between the fourth medium layer 40 and the fifth medium layer 41 is designed as a lenticular grating, and the unidirectional homogenizing and beam expanding of the projection unit can be achieved after the rays of light pass through the lenticular grating.

In other embodiments, the light incident surface may be designed as a plane, and the design concept is similar to that of the above embodiments, which will not be detailed here.

Figure 9:
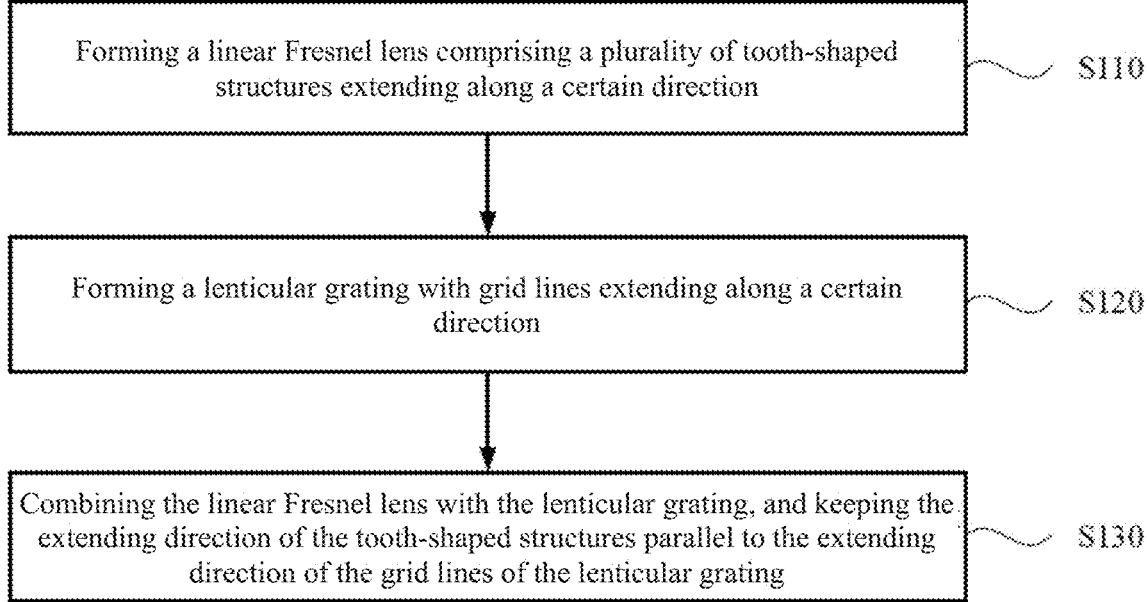
FIG. 9 is a schematic flowchart of a method for preparing a screen for unidirectional beam homogenizing and expanding according to an embodiment of the present application.

FIG. 9 is a schematic flowchart of a method for preparing the screen for unidirectional beam homogenizing and expanding according to an embodiment of the present application. The preparation method according to this embodiment is used to prepare the screen for unidirectional beam homogenizing and expanding according to the above embodiment, and comprises steps S110 to S130:

step S110, forming a linear Fresnel lens comprising a plurality of tooth-shaped structures extending along a certain direction;

step S120, forming a lenticular grating with grid lines extending along a certain direction; and step S130, combining the linear Fresnel lens with the lenticular grating, and keeping the extending direction of the tooth-shaped structures parallel to the extending direction of the grid lines of the lenticular grating.

Illustratively, a linear Fresnel lens and a lenticular grating may be formed on both surfaces of an integrated diaphragm, respectively; or a linear Fresnel lens and a lenticular grating may be each formed with two or three medium layers, and then bonded together, which is not limited in the embodiment of the present application.

According to the technical scheme of this embodiment, a linear Fresnel lens and a lenticular grating are formed, divergent beams of light emitted by a projection unit are deflected into approximately parallel beams of light through the linear Fresnel lens, and then the approximately parallel beams of light are approximately perpendicularly incident on the lenticular grating; beams of light that exit the linear Fresnel lens are expanded along a first direction, so that the uniform beam expanding in the first direction can be achieved by the lenticular grating due to the deflection effect of the linear Fresnel lens. When a splicing imaging of a plurality of projection units is performed, the brightness of seams can be made uniform, and when applied to a three-dimensional display device, the display brightness and homogeneity can be improved to promote the display effect.

Optionally, the linear Fresnel lens and the lenticular grating are in the form of an integrated diaphragm; the tooth-shaped structures of the linear Fresnel lens is formed on the surface of one side of the integrated diaphragm, and the lenticular grating is formed on the surface of the opposite side of the tooth-shaped structures of the integrated diaphragm. This embodiment can be used for preparing the screen for unidirectional beam homogenizing and expanding shown in FIG. 1.

Optionally, the screen for unidirectional beam homogenizing and expanding comprises a first medium layer, a second medium layer and a third medium layer sequentially stacked, and the preparation method therefor comprises:

preparing a linear Fresnel lens mold and a lenticular grating mold;

pressing a first medium layer and a third medium layer using the linear Fresnel lens mold and the lenticular grating mold, respectively; and bonding the pressed first medium layer and third medium layer using the second medium layer. This embodiment can be used for preparing the screen for unidirectional beam homogenizing and expanding shown in FIG. 7.

Optionally, the screen for unidirectional beam homogenizing and expanding comprises a fourth medium layer and a fifth medium layer arranged in a stacked manner; the preparation method therefor comprises:

forming a lenticular grating on one side of the fifth medium layer;

forming a fourth medium layer on the lenticular grating; and forming a linear Fresnel lens on one side of the fourth medium layer facing away from the fifth medium layer by an ultraviolet molding technology. This embodiment can be used for preparing the screen for unidirectional beam homogenizing and expanding shown in FIG. 8.

Figure 10:
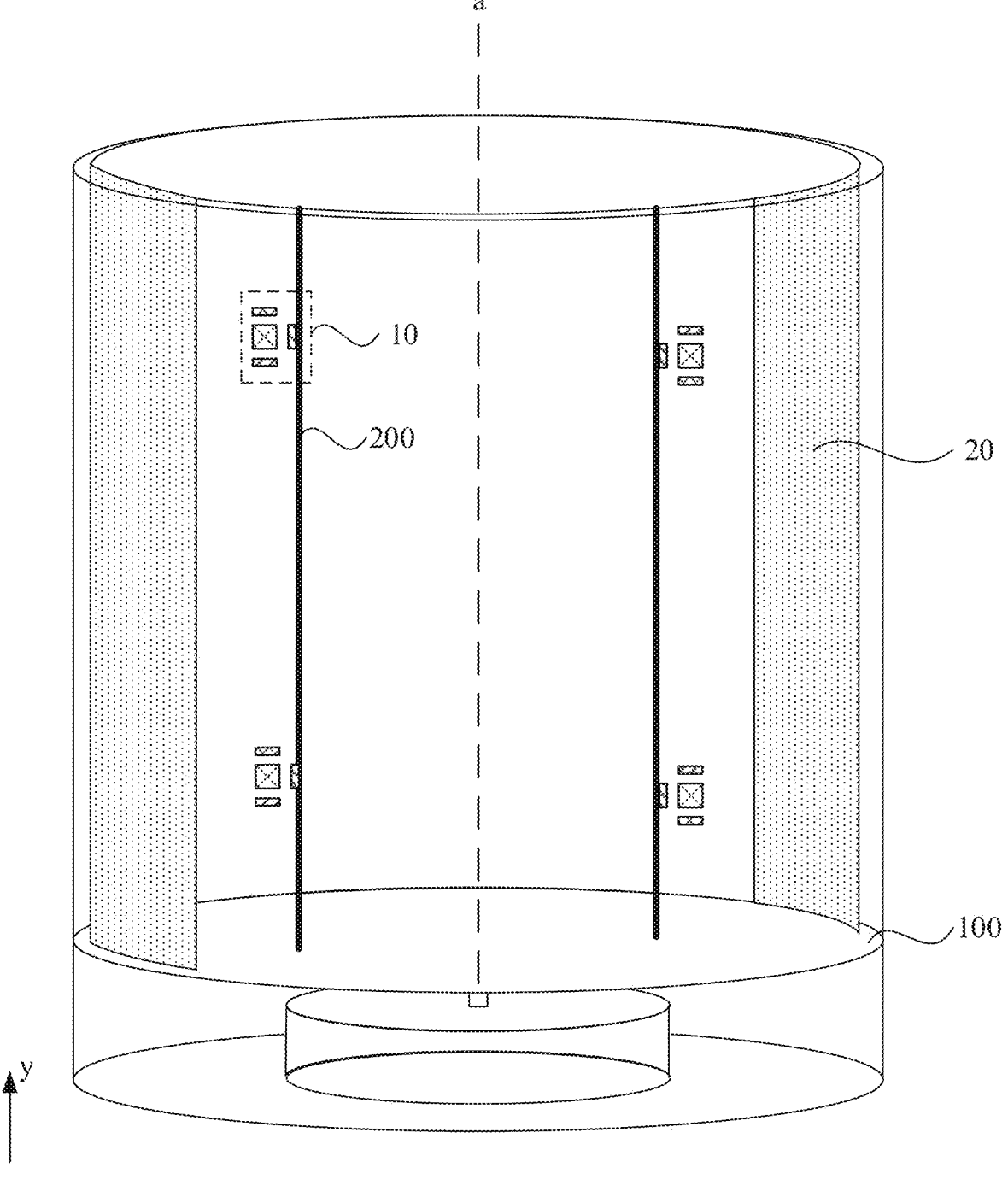
FIG. 10 is a schematic structural diagram of a three-dimensional display device according to an embodiment of the present application.

FIG. 10 is a schematic structural diagram of a three-dimensional display device according to an embodiment of the present application. Referring to FIG. 10, the three-dimensional display device according to this embodiment comprises: a rotary table 100 rotating around a central axis a of the rotary table 100, wherein the central axis a extends in a first direction y; at least one light pole 200 (two light poles 200 are schematically shown in FIG. 10, which is not a limitation on the embodiment of the present application) fixed on the rotary table 100, wherein the light pole 200 comprises at least one projection unit 10, each of the projection units 10 is arranged to emit light in at least two directions in a plane perpendicular to the first direction y to form at least two viewpoints; and any one of the screens for unidirectional beam homogenizing and expanding 20 according to the above embodiments, wherein the screens for unidirectional beam homogenizing and expanding 20 are arranged in one-to-one correspondence with the light poles 200, and positioned on emergent optical paths of the projection units 10.

The projection unit 10 may comprise at least one vector pixel or pico projector. In this embodiment, one light pole 200 corresponds to one screen for unidirectional beam homogenizing and expanding 20; and in another embodiment, at least two light poles 200 may also be arranged to correspond to one screen for unidirectional beam homogenizing and expanding 20. The number of the screen for unidirectional beam homogenizing and expanding 20 is not limited in this embodiment of the present application.

The arrangement of the screens for unidirectional beam homogenizing and expanding 20 on the outer side of the light poles 200 in FIG. 10 is only illustrative, in which case the three-dimensional imaging is observed by a viewer from the outside of the three-dimensional display device; in another embodiment, the screens for unidirectional beam homogenizing and expanding 20 can also be arranged on the inner side of the light poles, in which case the three-dimensional imaging is observed by a viewer from the inside of the three-dimensional display device; and in other embodiments, a plurality of three-dimensional display devices and reflectors can also be combined for splicing imaging, so as to achieve the effect of the splicing display and large-screen display.

The three-dimensional display device according to the embodiment of the present application has the characteristics of uniform display brightness and good display effect at each viewing angle by arranging any one of the screens for unidirectional beam homogenizing and expanding according to the above embodiments.

Figure 11:
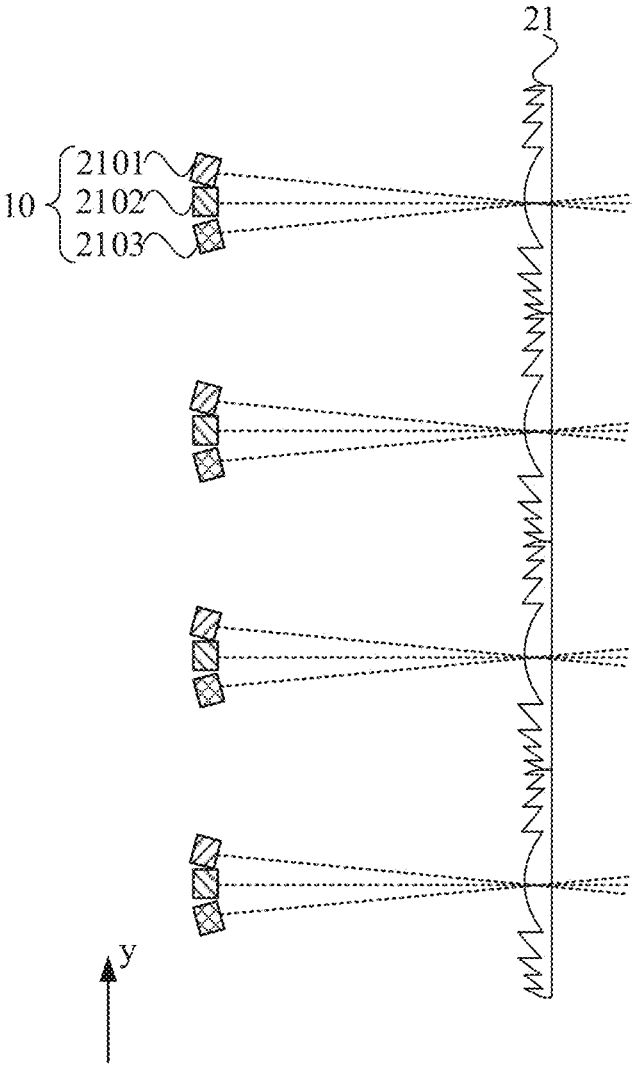
FIG. 11 is a schematic partial structural diagram of the three-dimensional display device according to an embodiment of the present application.

FIG. 11 is a schematic partial structural diagram of the three-dimensional display device according to an embodiment of the present application. Referring to FIG. 11, optionally, the projection unit 10 comprises a first vector pixel 2101, a second vector pixel 2102 and a third vector pixel 2103 arranged along the first direction y; the screen for unidirectional beam homogenizing and expanding comprises a plurality of linear Fresnel lenses 21 in one-to-one correspondence with the projection units 10, and the center of the second vector pixel 2102 is positioned at the same height as the center of the linear Fresnel lens 21 corresponding to the projection unit 10 where the second vector pixel 2102 is positioned.

The first vector pixel 2101, the second vector pixel 2102 and the third vector pixel 2103 may include a red pixel (R), a green pixel (G) and a blue pixel (B), and the projection unit achieves chromatic color display by setting RGB pixels. Illustratively, in FIG. 11, the center of the second vector pixel 2102 is positioned at the same height as the center of the linear Fresnel lens 21 corresponding to the projection unit 10 where the second vector pixel 2102 is positioned, the first vector pixel 2101 and the third vector pixel 2103 are arranged obliquely, and the center of the first vector pixel 2101 and the center of the third vector pixel 2103 point to the center of the linear Fresnel lens 21.

A straight line formed between the focal point of the linear Fresnel lens 21 and the center of the linear Fresnel lens 21 is perpendicular to the first direction y, and the projection unit is positioned at the focal point of the linear Fresnel lens 21, but the actual projection unit has a certain size and expands outward from the focal point, so that an area that can meet the viewing needs forms an incident effective position area. The size of the area is related to the scattering angle of the screen for unidirectional beam homogenizing and expanding, the distance between the projection unit and the screen for unidirectional beam homogenizing and expanding and the angle required for viewing, and can be referred to the above formula (1). In this embodiment, it is assumed that the vector pixels themselves has met the distortion requirements of the imaging, and if the distortion requirements are not met, a distortion correction lens needs to be added in front of each projection unit to reduce the distortion of the imaging.

Figure 12:
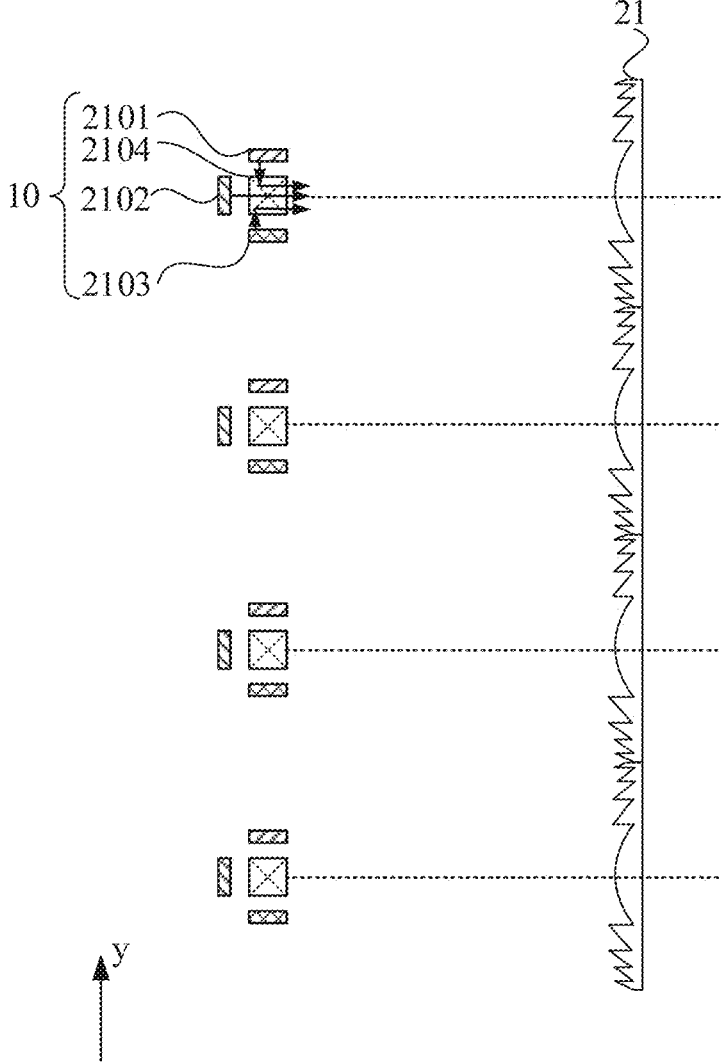
FIG. 12 is a schematic partial structural diagram of another three-dimensional display device according to an embodiment of the present application.

In the above embodiment, the center of the second vector pixel is positioned at the same height as the center of the linear Fresnel lens corresponding to the projection unit where the second vector pixel is positioned, and rays of light of the first vector pixel and the third vector pixel are obliquely incident on the linear Fresnel lens, which may cause aberration. In order to reduce the aberration caused by oblique incidence of the rays of light, FIG. 12 is a schematic partial structure diagram of another three-dimensional display device according to an embodiment of the present application. Referring to FIG. 12, optionally, the projection unit 10 comprises a first vector pixel 2101, a second vector pixel 2102, a third vector pixel 2103, and a color-combining prism 2104, wherein the color-combining prism 2104 is arranged to emit rays of light emitted from the first vector pixel 2101, the second vector pixel 2102 and the third vector pixel 2103 from the same position; the screen for unidirectional beam homogenizing and expanding 20 comprises a plurality of linear Fresnel lenses 21 in one-to-one correspondence with the projection units 10, and the center of the color-combining prism 2104 is positioned at the same height as the center of the linear Fresnel lens 21 corresponding to the projection unit 10 where the color-combining prism 2104 is positioned.

The color-combining prism 2104 is formed by different coated prisms, light of two colors of red, green and blue is reflected, light of the other color is transmitted, and by arranging the color-combining prism 2104, the problem that rays of light emitted by pixels are incident on the linear Fresnel lens 21 at a larger angle can be avoided, and aberration during imaging can be reduced.

In the above embodiments, the chromatic color projection is formed by pixel units (i.e., projection units) including chromatic color pixels of different colors, in other embodiments, the projection unit may be placed at different positions under the condition of monochrome projection, and chromatic color can be formed in a splicing manner under controllable distribution error, or by software modification, so that no color-combining prism is needed. Optionally, the projection unit comprises one vector pixel, that is, the projection unit comprises only 2102 of 210 in FIG. 11 or only 2102 of 210 in FIG. 12; the screen for unidirectional beam homogenizing and expanding comprises a plurality of linear Fresnel lenses in one-to-one correspondence with the projection units, and the center of a pixel unit (namely the center of the projection unit) is positioned at the same height as the center of the linear Fresnel lens corresponding to the pixel unit.

Figure 13:
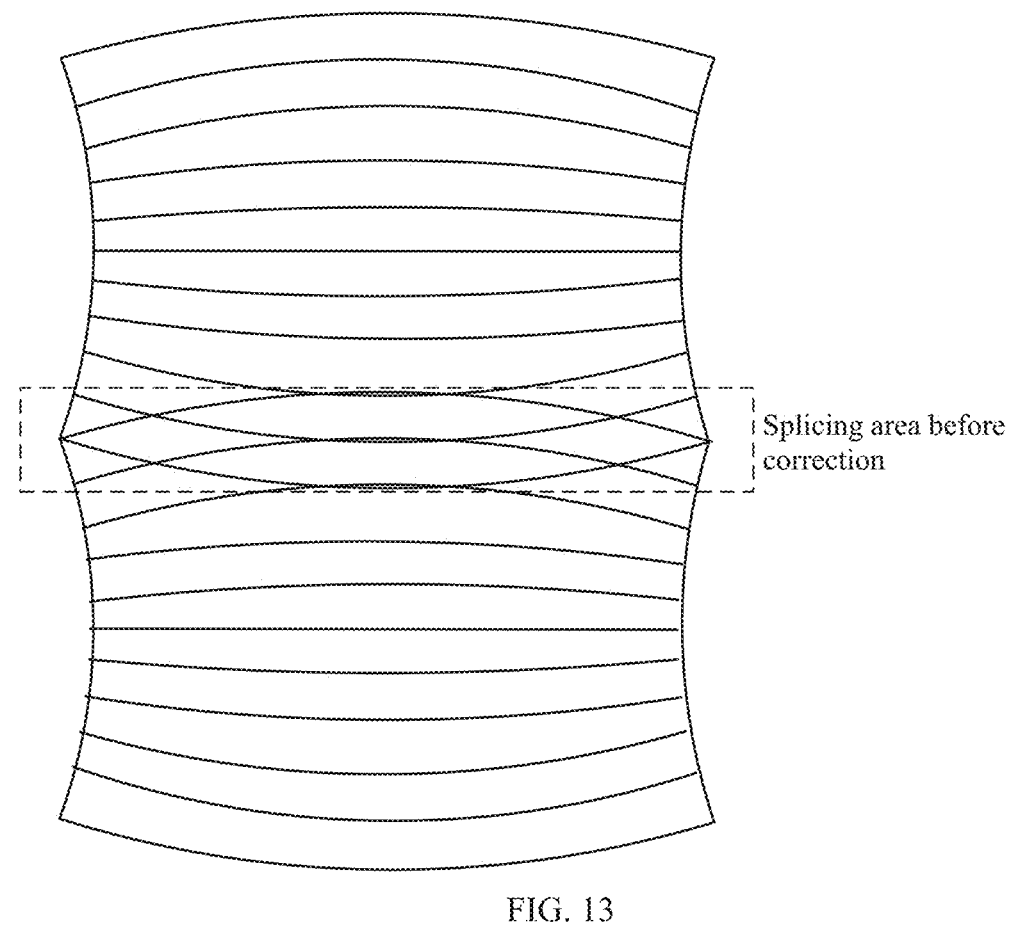
FIGS. 13 and 14 are schematic diagrams showing a comparison of distortion correction with a curved mirror set or without, respectively.
Figure 14:
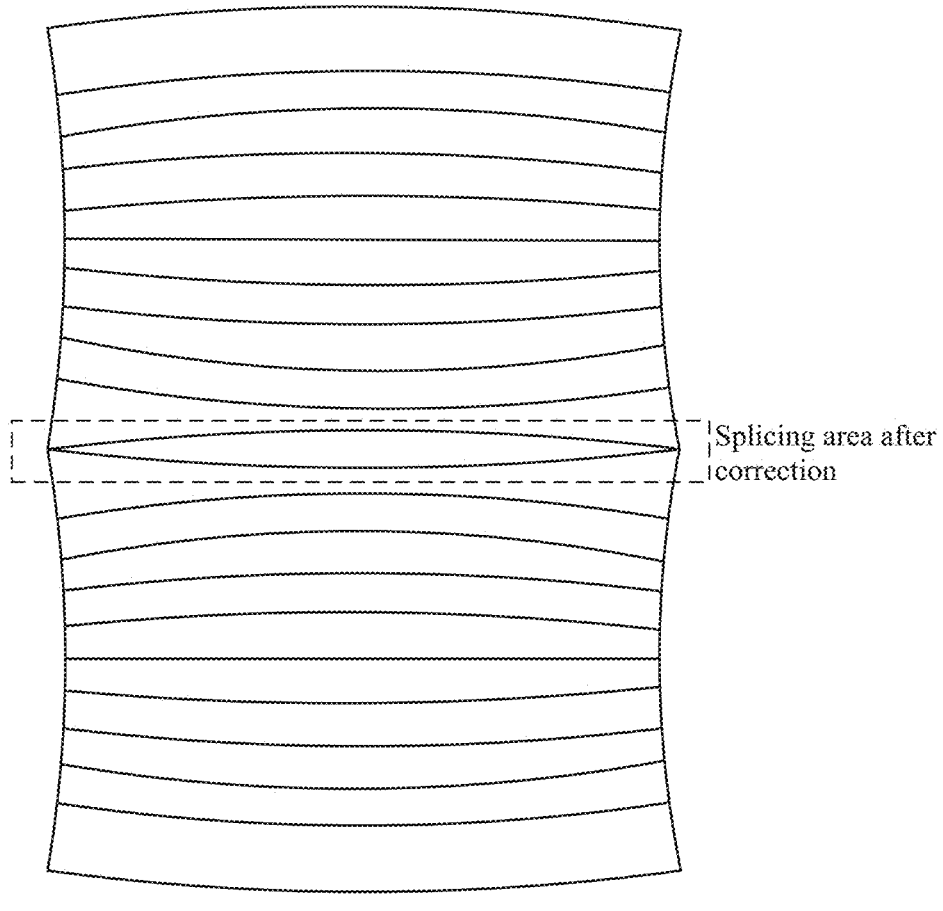

Typically, a splicing display of a plurality of vector pixels will occur because the limited resolution of individual vector pixels makes the display area insufficient to meet high-resolution viewing requirements. In the three-dimensional display device as shown in FIG. 10, a splicing display of at least two vector pixels (projection units) will occur on a single light pole, and since the optical modules of the vector pixels will cause field curvature and distortion during imaging at a large viewing angle, although the bending state of the screen for unidirectional beam homogenizing and expanding is helpful for reducing the field curvature and distortion, there will still be a gap between the images of adjacent vector pixels formed on the screen for unidirectional beam homogenizing and expanding during splicing, and although seamless splicing can be achieved by correction with image display software in the later stage, a large number of effective display pixels are lost. Since the distortion is caused by inconsistent magnification in imaging to distort the image, the lateral magnification of the central imaging area of the lens (i.e., the optical module in the vector pixel) is inconsistent with the lateral magnification of the edge, and if the central magnification is smaller than the edge magnification, a pincushion distortion is generated, and if the central area magnification is larger than the edge magnification, a barrel distortion is generated. The distortion is caused by lens imaging and is only related to the field of view of the lens. The larger the field of view is, the larger the distortion is, and the distortion can only be reduced but cannot be eliminated. In order to reduce the gap, optionally, the three-dimensional display device according to this embodiment further comprises a curved mirror, wherein the curved mirror is positioned between the light pole and the screen for unidirectional beam homogenizing and expanding. The curved mirror can be formed by optical glass with the same center of curvature on both surfaces, thereby reducing distortion and achieving the purpose of seamless splicing. Illustratively, FIGS. 13 and 14 are schematic diagrams showing a comparison of distortion correction with a curved mirror set or without, respectively, in which FIG. 13 is a schematic diagram before correction (with no curved mirror set), and FIG. 14 is a schematic diagram after correction (with a curved mirror set), and it can be seen from FIGS. 13 and 14 that the distortion of the splicing area can be corrected significantly by setting the curved mirror, indicating the display effect. When applied in the three-dimensional display device shown in FIG. 10, the vector pixels are vertically arranged on the light pole, and splicing can be achieved simply by correcting the distortion of the vector pixels in the horizontal direction, so that the above optical glass can meet the requirements by having curvature only in the horizontal direction.

The light pole is fixed to ensure stability, and the aberration correction can also be performed by a digital correction method. The light pole is placed on a test table, a plurality of corrected cameras are arranged outside the test table in all directions, and the correction process is automatically completed through feedback. The parameters for the non-camera area need to be generated using a reasonable difference algorithm, and the more cameras there are, the higher the correction precision is. The correction includes alignment adjustment, distortion correction, and color and brightness correction. After the correction is qualified, the obtained correction parameters for each light pole will be stored on the control panel of the light pole.

Optionally, when the designed vertical viewing area is small, different linear Fresnel lenses can be designed and used in different areas of the light pole, and the angle of divergence of the lenticular grating is reduced, so that the brightness is improved.

The invention claimed is:

1. A three-dimensional display device comprising: a rotary table rotating around a central axis of the rotary table, wherein the central axis extends in a first direction at least one light pole fixed on the rotary table, wherein the at least one light pole comprises a plurality of projection units, wherein each projection unit of the plurality of projection units is arranged to emit light in at least two directions in a plane perpendicular to the first direction to form at least two viewpoints: and a plurality of screens for unidirectional beam homogenizing and expanding, wherein the plurality of screens are arranged to expand, along the first direction, beams of light with different angles of emergence emitted by the plurality of projection units, with propagation direction along the second direction, wherein each screen of the plurality of screens comprises a lenticular grating and a plurality of linear Fresnel lenses, wherein each linear Fresnel lens of the plurality of linear Fresnel lenses is positioned between at least one projection unit of the plurality of the projection units and the lenticular grating, wherein at least one linear Fresnel lens of the plurality of linear Fresnel lenses comprises a plurality of tooth-shaped structures extending along the second direction, and the at least one linear Fresnel lens is arranged to deflect the beams of light emitted by the at least one projection unit to cause the deflected beams of light to enter into the lenticular grating, wherein one or more grid lines of the lenticular grating extend along the second direction, and the one or more grid lines of the lenticular grating is arranged to expand the beams of light from the at least one linear Fresnel lens along the first direction, wherein at least two linear Fresnel lenses of the plurality of linear Fresnel lenses are arranged along the first direction, wherein the plurality of screens for unidirectional beam homogenizing and expanding are positioned on emergent optical paths of the plurality of projection units, wherein the at least one projection unit comprises a first vector pixel, a second vector pixel and a third vector pixel arranged along the first direction; wherein the plurality of linear Fresnel lenses are in one-to-one correspondence with the plurality of projection units, and a center of the second vector pixel is positioned at the same height as a center of the at least one linear Fresnel lens corresponding to the at least one projection unit where the second vector pixel is positioned.

2. The three-dimensional display device of claim 1, wherein the projection unit is arranged at a focal point of the at least one linear Fresnel lens.

3. The three-dimensional display device of claim 1, wherein the projection unit is arranged on a focal plane of the at least one linear Fresnel lens, and a distance h between the projection unit and a focal point of the at least one linear Fresnel lens satisfies:

$$h \leq L \cdot \tan\frac{\varphi - \theta}{2};$$

wherein L represents a focal length of the at least one linear Fresnel lens, φ represents an actual beam expansion angle of the three-dimensional display device along the first direction, and θ represents a desired viewing angle along the first direction.

4. The three-dimensional display device of claim 1, further comprising a support lens positioned on one side of the lenticular grating facing away from the projection unit, wherein the support lens is arranged to support the at least one linear Fresnel lens and the lenticular grating.

5. The three-dimensional display device of claim 4, wherein one side of the support lens close to the projection unit is a first surface, the first surface is a curved surface, the lenticular grating is attached to the first surface of the support lens, and the at least one linear Fresnel lens is attached to one side of the lenticular grating facing away from the support lens.

6. The three-dimensional display device of claim 4, wherein the support lens is an iso-thickness lens or a cylindrical concave lens.

7. The three-dimensional display device of claim 1, wherein the at least one linear Fresnel lens and the lenticular grating are in a form of an integrated diaphragm, the tooth-shaped structures of the at least one linear Fresnel lens are positioned on a surface of one side of the integrated diaphragm close to the projection unit, and the lenticular grating is positioned on the surface of one side of the integrated diaphragm facing away from the projection unit.

8. The three-dimensional display device of claim 1, comprising a first medium layer, a second medium layer and a third medium layer sequentially stacked, wherein the first medium layer is positioned on one side of the second medium layer close to the projection unit, and the first medium layer and the third medium layer both have a greater index of refraction than the second medium layer;

an interface between the first medium layer and the second medium layer is provided with the tooth-shaped structures of the at least one linear Fresnel lens, the interface between the second medium layer and the third medium layer is provided with the lenticular grating, and a surface of the third medium layer facing away from the second medium layer is a plane.

9. The three-dimensional display device of claim 8, wherein the first medium layer and the third medium layer have the same index of refraction.

10. The three-dimensional display device of claim 1, comprising a fourth medium layer and a fifth medium layer arranged in a stacked manner, wherein the fourth medium layer is positioned on one side of the fifth medium layer close to the projection unit, and the fifth medium layer has a greater index of refraction than the fourth medium layer;

a surface of one side of the fourth medium layer close to the projection unit is provided with the tooth-shaped structures of the at least one linear Fresnel lens, an interface between the fourth medium layer and the fifth medium layer is provided with the lenticular grating, and a surface of the fifth medium layer facing away from the fourth medium layer is a plane.

11. The three-dimensional display device of claim 1, wherein one pixel in the projection unit has a spot width of $d_1$ along the first direction on the three-dimensional display device, the lenticular grating has a grating constant of $d_2$, and $d_1 \geq 3d_2$.

12. A three-dimensional display device comprising: a rotary table rotating around a central axis of the rotary table, wherein the central axis extends in a first direction; at least one light pole fixed on the rotary table, wherein the at least one light pole comprises a plurality of projection units, wherein each projection unit of the plurality of projection units is arranged to emit light in at least two directions in a plane perpendicular to the first direction to form at least two viewpoints; a plurality of screens for unidirectional beam homogenizing and expanding; and further comprising a curved mirror, wherein the curved mirror is positioned between the at least one light pole and the plurality of the screens for unidirectional beam homogenizing and expanding wherein the plurality of screens are arranged to expand, along the first direction, beams of light with different angles of emergence emitted by the plurality of projection units, with propagation direction along the second direction, wherein each screen of the plurality of screens comprises a lenticular grating and a plurality of linear Fresnel lenses, wherein each linear Fresnel lens of the plurality of linear Fresnel lenses is positioned between at least one projection unit of the plurality of the projection units and the lenticular grating, wherein at least one linear Fresnel lens of the plurality of linear Fresnel lenses comprises a plurality of tooth-shaped structures extending along the second direction, and the at least one linear Fresnel lens is arranged to deflect the beams of light emitted by the at least one projection unit to cause the deflected beams of light to enter into the lenticular grating, wherein one or more grid lines of the lenticular grating extend along the second direction, and the one or more grid lines of the lenticular grating is arranged to expand the beams of light from the at least one linear Fresnel lens along the first direction, wherein at least two linear Fresnel lenses of the plurality of linear Fresnel lenses are arranged along the first direction, and wherein the plurality of screens for unidirectional beam homogenizing and expanding are positioned on emergent optical paths of the plurality of projection units.

13. The three-dimensional display device of claim 12, wherein the at least one projection unit comprises a first vector pixel, a second vector pixel, a third vector pixel and a color-combining prism, wherein the color-combining prism is arranged to emit rays of light emitted by the first vector pixel, the second vector pixel and the third vector pixel from the same position;

wherein the plurality of linear Fresnel lenses are in one-to-one correspondence with the plurality of projection units, and a center of the color-combining prism is positioned at the same height as a center of the at least one linear Fresnel lens corresponding to the at least one projection unit where the color-combining prism is positioned.

14. The three-dimensional display device of claim 12, wherein the at least one projection unit comprises one vector pixel; wherein the plurality of linear Fresnel lenses are in one-to-one correspondence with the projection units, and a center of the at least one projection unit is positioned at the same height as a center of the at least one linear Fresnel lens corresponding to the at least one projection unit.

15. The three-dimensional display device of claim 12, further comprising a support lens positioned on one side of the lenticular grating facing away from the projection unit, wherein the support lens is arranged to support the at least one linear Fresnel lens and the lenticular grating.

16. The three-dimensional display device of claim 15, wherein one side of the support lens close to the projection unit is a first surface, the first surface is a curved surface, the lenticular grating is attached to the first surface of the support lens, and the at least one linear Fresnel lens is attached to one side of the lenticular grating facing away from the support lens.

17. A three-dimensional display device comprising: a rotary table rotating around a central axis of the rotary table, wherein the central axis extends in a first direction; at least one light pole fixed on the rotary table, wherein the at least one light pole comprises a plurality of projection units, wherein each projection unit of the plurality of projection units is arranged to emit light in at least two directions in a plane perpendicular to the first direction to form at least two viewpoints; and a plurality of screens for unidirectional beam homogenizing and expanding, wherein the plurality of screens are arranged to expand, along the first direction, beams of light with different angles of emergence emitted by the plurality of projection units, with propagation direction along the second direction, wherein each screen of the plurality of screens comprises a lenticular grating and a plurality of linear Fresnel lenses, wherein each linear Fresnel lens of the plurality of linear Fresnel lenses is positioned between at least one projection unit of the plurality of the projection units and the lenticular grating, wherein at least one linear Fresnel lens of the plurality of linear Fresnel lenses comprises a plurality of tooth-shaped structures extending along the second direction, and the at least one linear Fresnel lens is arranged to deflect the beams of light emitted by the at least one projection unit to cause the deflected beams of light to enter into the lenticular grating, wherein one or more grid lines of the lenticular grating extend along the second direction, and the one or more grid lines of the lenticular grating is arranged to expand the beams of light from the at least one linear Fresnel lens along the first direction, wherein at least two linear Fresnel lenses of the plurality of linear Fresnel lenses are arranged along the first direction, wherein the plurality of screens for unidirectional beam homogenizing and expanding are positioned on emergent optical paths of the plurality of projection units, wherein the at least one projection unit is arranged at a focal point of the at least one linear Fresnel lens of at least one screen of the plurality of screens.

18. The three-dimensional display device of claim 17, wherein the at least one projection unit is arranged on a focal plane of the at least one linear Fresnel lens, and a distance h between the at least one projection unit and a focal point of the at least one linear Fresnel lens satisfies:

$$h \le L \cdot \tan\frac{\varphi - \theta}{2};$$

wherein L represents a focal length of the at least one linear Fresnel lens, $\varphi$ represents an actual beam expansion angle of at least one screen of the plurality of screens for unidirectional beam homogenizing and expanding along the first direction, and $\theta$ represents a desired viewing angle along the first direction.

19. The three-dimensional display device of claim 17, wherein at least one screen of the plurality of screens further comprises a support lens positioned on one side of the lenticular grating facing away from the at least one projection unit, wherein the support lens is arranged to support the at least one linear Fresnel lens and the lenticular grating.

20. The three-dimensional display device of claim 19, wherein one side of the support lens close to the at least one projection unit is a curved surface, the lenticular grating is attached to the curved surface of the support lens, and the at least one linear Fresnel lens is attached to one side of the lenticular grating facing away from the support lens, or wherein the support lens is an iso-thickness lens or a cylindrical concave lens.

\* \* \* \* \*